United States Patent
Ripberger

(10) Patent No.: US 6,219,726 B1
(45) Date of Patent: Apr. 17, 2001

(54) SYSTEM FOR PROVIDING ACCESS PROTECTION ON MEDIA STORAGE DEVICES BY SELECTING FROM A SET OF GENERATED CONTROL PARAMETERS IN ACCORDANCE WITH APPLICATION ATTRIBUTES

(75) Inventor: Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/281,868

(22) Filed: Jul. 27, 1994

(51) Int. Cl.[7] .................................................. G06F 12/14
(52) U.S. Cl. ........................... 710/36; 710/200; 711/151; 711/152
(58) Field of Search .................................... 395/856, 857, 395/726, 477, 478

(56) References Cited

U.S. PATENT DOCUMENTS

| | | | |
|---|---|---|---|
| 4,525,780 | * 6/1985 | Bratt et al. ........................... | 364/200 |
| 4,604,694 | * 8/1986 | Hough .................................. | 364/200 |
| 4,780,821 | * 10/1988 | Crossley ............................... | 364/200 |
| 4,941,107 | * 7/1990 | Hasebe ................................. | 364/518 |
| 5,065,429 | * 11/1991 | Lang .................................... | 380/25 |
| 5,191,611 | * 3/1993 | Lang .................................... | 380/25 |
| 5,276,735 | * 1/1994 | Boebert ................................ | 380/21 |
| 5,283,830 | * 2/1994 | Hinsley et al. ........................ | 380/25 |
| 5,339,403 | * 8/1994 | Parker ................................. | 395/425 |

* cited by examiner

Primary Examiner—Thomas C. Lee
Assistant Examiner—Duo Chen
(74) Attorney, Agent, or Firm—Benman & Collins; Robert M. Sullivan

(57) ABSTRACT

A method and system for limiting access to a media storage device such as a tape drive unit. In accordance with the inventive method, a set of control parameters is generated for the device for a given application program. A tape control unit uses the parameters to process commands from the application program and thereby control access to the tape. In an illustrative application, an extent is defined on the tape and controls are defined which govern the type of access permitted within the extent. The system rejects any commands which attempt to access medium outside of the defined extent. Write and formatting commands within the extent are limited and partition changes, loads and unloads are prohibited.

4 Claims, 3 Drawing Sheets

SYSTEM FOR PROVIDING ACCESS PROTECTION ON MEDIA STORAGE DEVICES BY SELECTING FROM A SET OF GENERATED CONTROL PARAMETERS IN ACCORDANCE WITH APPLICATION ATTRIBUTES

BACKGROUND OF THE INVENTION

Field of the Invention:

The present invention relates to storage devices. More specifically, the present invention relates to systems for regulating access to tape devices.

Description of the Related Art:

Data integrity is a key consideration in any data processing system. Most data processing environments have requirements to prevent data integrity problems due to unauthorized access to data. Certain programs exist which allow a system to input access criteria for datasets and access authority for users. The system then uses this information to manage data access. For tape devices, this protection mechanism is typically limited to management of access to the entire tape, referred to as a "volume".

Tape devices have, however, traditionally supported the storing of multiple datasets on the same volume. Even in the case of a single dataset, there is the additional consideration that there may be residual data left on the medium from some prior usage which is beyond the end of the last written dataset. Access to such residual information is referred to as "object reuse" in some arenas. Both of these conditions represent potential security exposures if the accesses to the medium are not managed to the scope of the data on the medium to which the user is authorized. This would typically be a single dataset.

In certain environments, tape applications are allowed to issue input/output (I/O) commands (e.g., channel programs), typically without much supervision by the control program. In other environments, the control program is responsible for performing label and file formatting while the application is responsible for reading or writing the data portion of the file. Although some devices provide a protection assist mechanism to reject certain commands which are reserved for use by the control program, this protection is not used to control commands which access the medium. With the introduction of commands which allow random position to different blocks or partitions on the medium, an application has the ability to position outside of the single file which it has been given access to by the control program and associated security software. There are also critical applications which utilize these functions within the limit of a single file with significant performance improvement so that it is not possible to simply remove the ability to issue these commands from the applications.

One currently used solution to prevent object reuse is to store only one file on the volume and to erase the rest of the volume following the dataset. This solution has the following problems.

First, only a single file can be stored on the volume. Multiple files would be exposed to the application accessing data in more than one file. As volume capacities increase, storage of multiple files to utilize capacity becomes a critical part of storage management. The average file size is typically significantly less than the full capacity of a volume.

Second, the application may overwrite formatted portions of the volume which should not be overwritten, such as the label group for the dataset.

Third, the application may attempt to write formatting information, such as tape marks, which would lead to invalid file formatting on the medium.

Fourth, The application may attempt to unload the medium before the control program has a chance to finish file formatting on the medium. This might allow the application to unload the current medium and access some other medium. For example, some devices provide a Load command. Some device loaders have an automatic mode of loading which causes another volume to be loaded when the current volume is unloaded.

Fifth, the time required to perform an erase function may be significant. On most tape devices, this function requires that the device overwrite any portions of the volume which follow the end of the file. As volume capacities increase, the time spent performing this function increases linearly. For instance, the time to erase a 10 gigabit volume on a device which writes at a 1 megabit per second data rate would be roughly 10,000 seconds or three hours. If a significant number of the files processed require this type of processing, then the availability of tape devices for normal processing is severely impacted.

A second alternative is for the control program to scan through every channel program which is received from an application to determine whether there are any commands which might have undesirable effects. This solution has the following problems.

First, there is overhead associated with the scanning of each channel program.

Second, the channel program is typically in the user's address space which may lead to additional complexities with storage protection keys and address space translation problems.

Third, the control program may need to examine the parameter data associated with the command in order to assess its impact. This implies that a detailed knowledge of the device command set must be coded into the control program. It also creates the problem of having to update the control program every time new functions are introduced so that they are not rejected by the checking performed in the control program (e.g., an unknown function or command must be assumed to be a potential access violation and therefore it must be rejected). This may prohibit the early introduction of new functions by providing support directly in the application without the control program's knowledge.

Fourth, the program may not be able to assess whether the command creates a problem or not. For instance, a Locate command specifies some logical block further down the medium. The control program may or may not know the extent (e.g., the range of logical blocks) of the currently active dataset and therefore may not be able to determine whether the access is outside the range of the dataset.

Thus, there is a need in the art for a fast, inexpensive technique for limiting access to a tape volume which does not waste the unused capacity thereof.

SUMMARY OF THE INVENTION

The need in the art is addressed by the present invention which provides a method and system for limiting access to a media storage device such as a tape drive unit. In accordance with the inventive method, a set of control parameters is generated for the device for a given application program. A tape control unit uses the parameters to process commands from the application program and thereby control access to the tape. In a illustrative application, an extent is defined on the tape and controls are defined which govern the type of access permitted within the extent. The system rejects any commands which attempt to access medium outside of the defined extent. Write and formatting commands within the extent are limited and partition changes, loads and unloads are prohibited.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
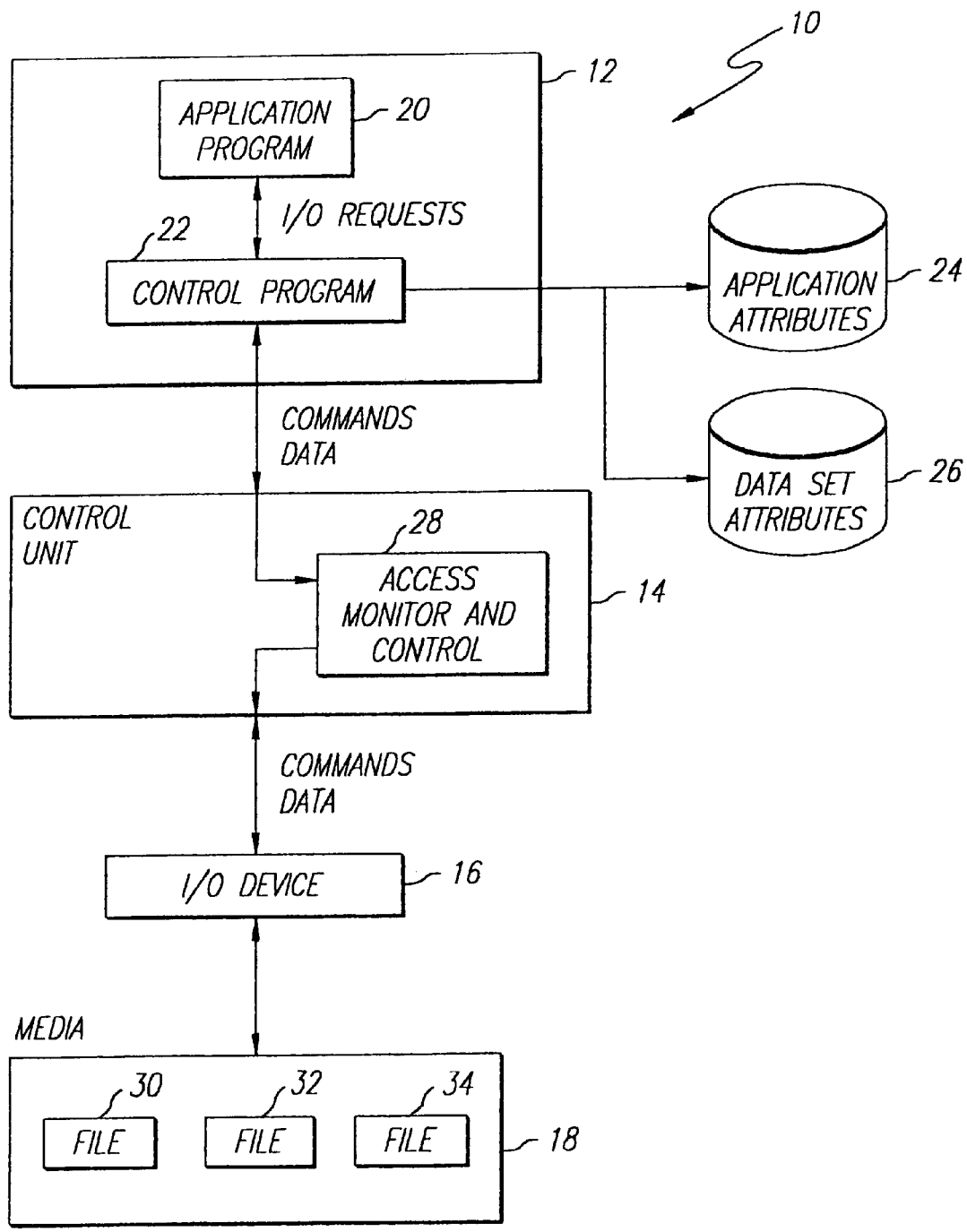
FIG. 1 is block diagram of a computer device input/output system utilizing the teachings of the present invention.

FIG. 1 is block diagram of a computer device input/output system utilizing the teachings of the present invention. The system 10 includes a computer 12, a device control unit 14, a input/output device 16 and media 18. A user application program 20 running on the computer 12 generates input and output (I/O) requests which are received and interpreted by a computer control program 22. In a typical implementation, the application program may be a word processing program and the control program may be an operating system program such as DOS or UNIX.

In accordance with the present teachings, on initiation of an application request, the control program 22 identifies the attributes of the application program (24) and of a dataset (26) on which the program is operating and generates a set of controls for an access monitor and control program 28 of the device control unit 14. Typical application attributes include a list of data groups to which it has an access privilege (e.g., read-only, read-write, etc.) and typical dataset attributes include a data group with which it is associated and perhaps limitations on access (i.e., read-only, read-write, etc.).

The control unit 14 is a device manager having a microprocessor (not shown) which converts signals formatted with the protocol of the computer 12 into signals formatted with the protocol of the input/output device 16. The control unit 14 also controls the I/O device 16 to format and position the media 18 and to access individual files 30, 32 and 34 therein. In the illustrative embodiment, the I/O device 16 is a tape drive unit and the media 18 is a tape.

Figure 2:
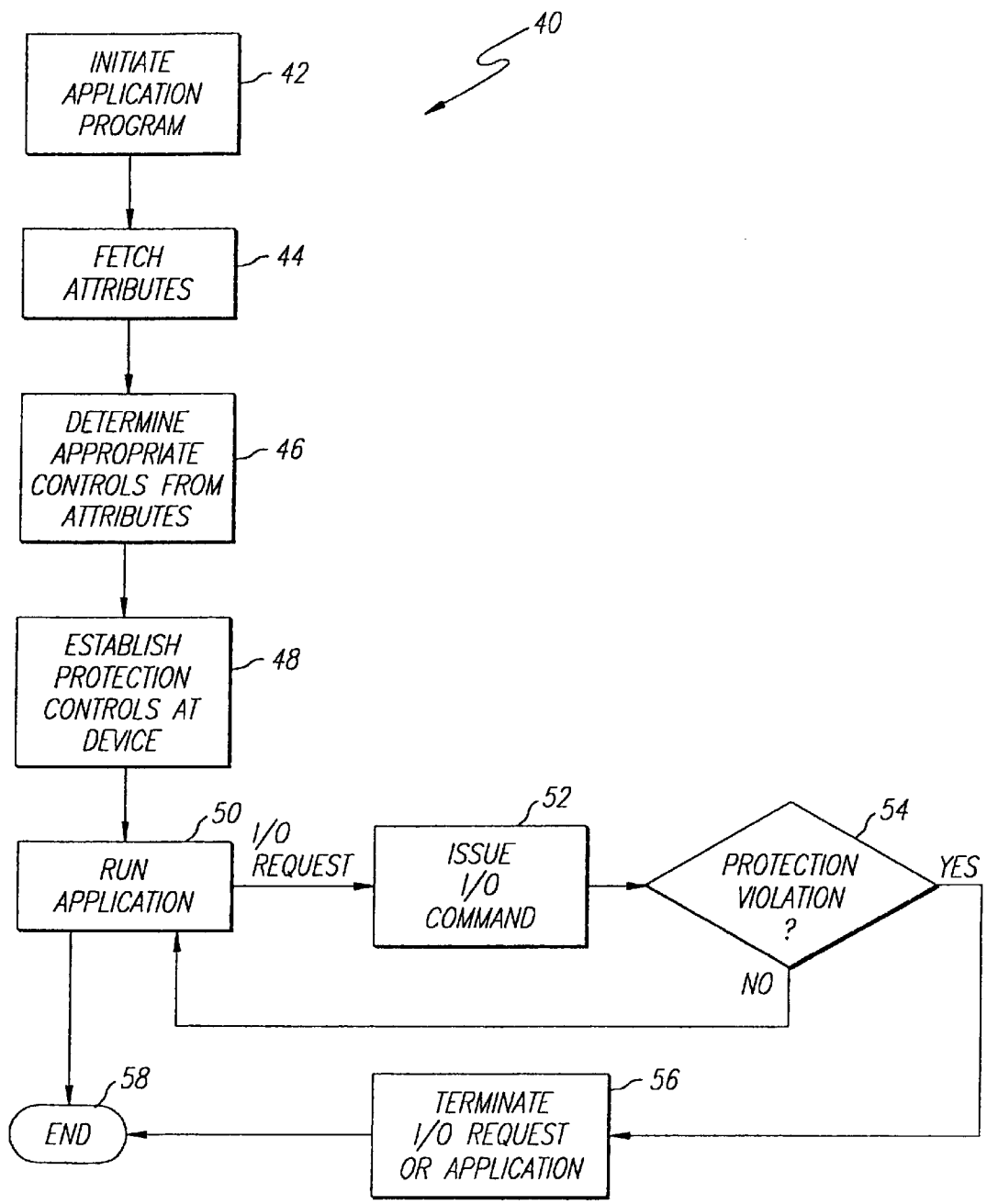
FIG. 2 is a flow diagram of the control program logic utilized in the system of the present invention.
Figure 3:
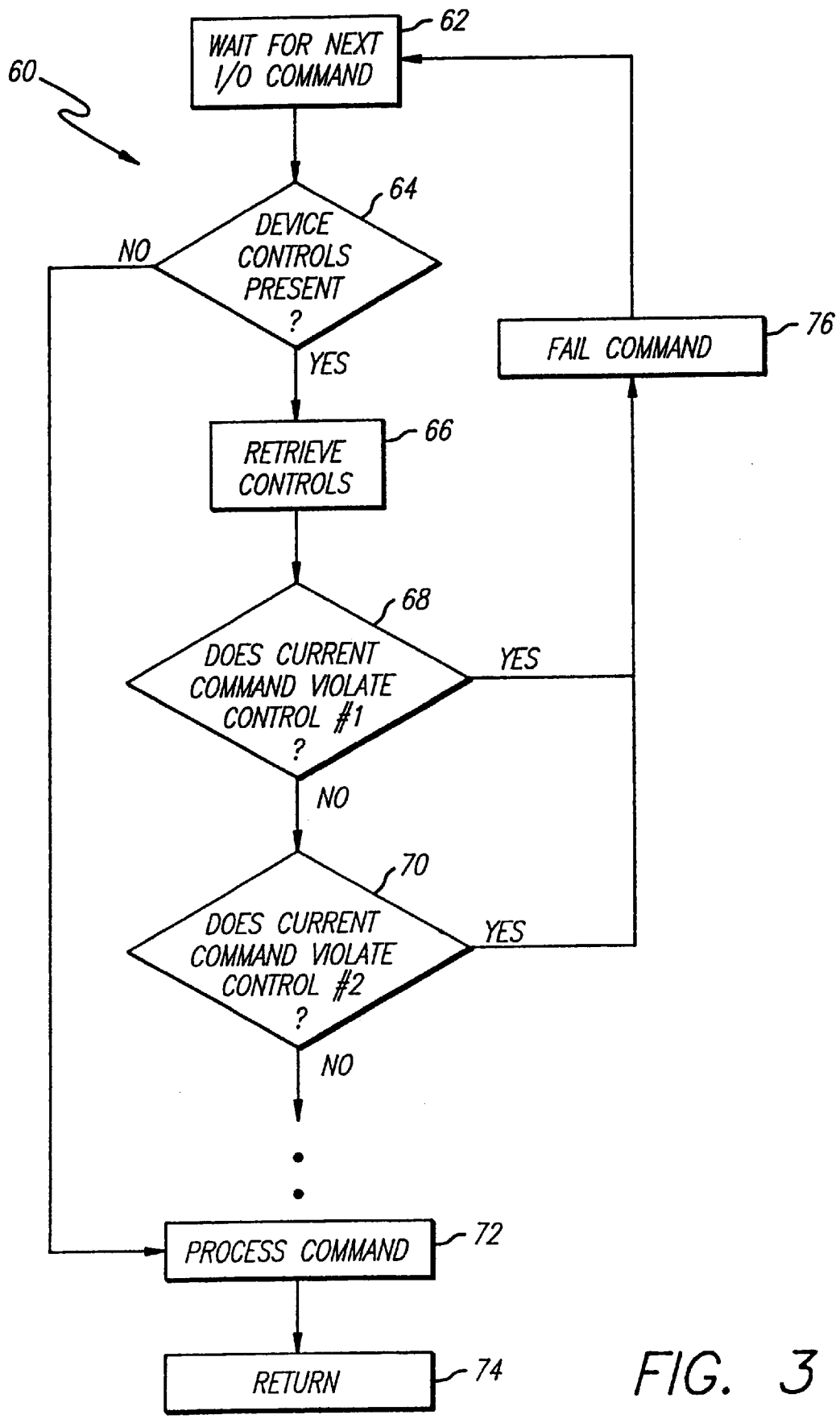
FIG. 3 is a flow diagram of the device control logic utilized in the system of the present invention.

The operation of the present invention is illustrated in the flow diagrams of FIGS. 2 and 3. FIG. 2 is a flow diagram of the control program logic utilized in the system of the present invention. FIG. 3 is a flow diagram of the device control logic utilized in the system of the present invention.

As illustrated in FIG. 2, at step 42 of the flow diagram 40, the control program 22 receives a request to run the application program 20. At step 44, the program 22 fetches application and dataset attributes 24 and 26, respectively. Next, at step 46, the program 22 determines appropriate controls from the attributes. For example, if the program has read access to the data group with which the dataset is associated, the controls would specify accesses limited to reads and limited to the section of the medium associated with that dataset.

At step 48, the controls are sent to the access monitor and control program 28 of control unit 14 and stored in memory (not shown) Next, the application program is run (step 50). At steps 52 and 54, I/O requests are processed by the device control logic routine 60 of FIG. 3 in the access monitor and control program 28. If a protection violation is detected, the I/O request and, in some cases, the application program are terminated and the routine ends (step 58). If no protection violation occurs, the application is allowed to access the device 16.

As illustrated in FIG. 3, the device control logic routine of the access monitor and control program 28 processes I/O requests from the application program and detects protection violations by first checking in memory to determine if device controls are present (step 64). If not, the command is processed. If, however, device controls are present in memory, the routine 60 retrieves the controls at step 66. Then, the I/O command is checked against each of the controls (step 68, 70, etc.). If none of the controls are violated, the command is processed (step 72) and good status is returned to the control program (step 74). If, however, any of the controls are violated, the command fails (step 76) and a protection violation is indicated to the control program (step 54 of FIG. 2).

The controls may be defined as follows. First, an extent is defined on the medium 18 as a range of logically consecutive storage locations on the medium 18. For example, for a tape volume which is access only for reading, it is a range of logical blocks starting at one logical block in a given medium partition through a series of consecutive logical blocks in the same partition or in one or more subsequent medium partitions. For a volume which is to be written, the extent would typically have a specific starting position, such as the beginning of a partition or following some specified logical block, and a generalized ending position, such as the end of the same or some subsequent partition.

In accordance with the present teachings, a new command is created (e.g., "Define Extent"). This command is used to specify the beginning and ending position of the extent of medium to be protected. In order to handle different conditions, the starting position argument should be able to specify the start of the extent in any one of the following ways: 1) beginning of medium; 2) beginning of partition; 3) the current medium position (e.g., before the next block in the forward direction); 4) the position after the preceding tape mark; and 5) a specified partition number and logical block number on the medium. Items 1 or 2 would typically be used for cases where the application has access to either the entire medium or the entire partition, respectively. Item 3 would typically be used when the medium is positioned to the beginning of the file to be accessed. Item 4 would typically be the same as item 3 in the case of a file which is accessed in the forward direction. Item 4 would also be useful for specifying the beginning of a file when the medium is positioned to the end of the file. Item 5 can be used to define an arbitrary starting point on the medium. For all cases except 4, the device can determine a specific partition number and logical block number associated with the start of the extent. For case 4, the device can determine a specific partition number and logical block number associated with the start of the extent if and only if it has already accessed all logical blocks between the preceding tape mark and the current location.

In order to handle different conditions, the ending position argument should be able to specify the end of the extent in any of the following ways; 1) end of medium; 2) end of partition; 3) the current medium position (e.g., after the next block in the backward direction); 4) the position before the succeeding tape mark; 5) end of data (e.g., after the last valid block written); and 6) a specified partition number and logical block number on the medium.

Items 1 or 2 would typically be used for write cases where the application has access to all data following the start of extent on the entire medium or the entire partition, respectively. Item 3 would typically be used when the medium is positioned to the end of the file which is to be accessed. Item 4 would typically be used when the medium is positioned to the beginning of the file which is to be accessed for reading and the control program does not know the exact position of the end of the file (as indicated by the next tape mark in the forward direction). Item 5 would be used to access data up to the last block written to the medium from the last recording pass. This would typically be used if the application has access to all valid data on the medium (e.g., including any labels and tape marks at the end of the file). This option should not be provided on devices which do not support an end of data mark or, perhaps, in cases where the end of data mark may not have been written. Item 6 can be used to define an arbitrary ending point on the medium. For all cases except 4 and 5, the device can determine a specific partition number and logical block number associated with the end of the extent. For cases 4 and 5, the device can determine a specific partition number and logical block number associated with the end of the extent if and only if it has already accessed all logical blocks between the current medium position and the specified end of extent.

Secondly, the controls are defined which govern the type of access on the medium which are allowed. In the absence of the following controls, the application program would normally have full read and write access to any portion of the medium:

Extent Protect:
When active, any commands which attempt to position the medium outside the extent specified by the last Define Extent command which was issued are rejected. In effect, medium positioning must remain within the limits of the defined extent. The control is not allowed to be activated if the medium is not positioned within the extent when the command is issued. The performance of a Locate command may be limited if the device cannot associate the extent boundary in the direction of travel with a specific logical block number as discussed above. In this case, the device normally must sequentially access all blocks between the current position and target position to ensure that the extent boundary condition is not encountered. In cases where this performance degradation is likely for a Locate operation and additionally the applications under consideration are dependent on the Locate command, an extent boundary specification should be used which can be associated with a logical block number. This problem is most typical for a read access of a file where the end of extent is specified as preceding the next tape mark. For this case, it is recommended that the control program save start and end positions (e.g., logical block numbers) for a file when it is created so that they can be used to specify the extent ranges at a later time.

Write Protect:
When active, write type commands are rejected. In this case, the program has read-only access to the portion of the volume which is accessible (e.g., the entire volume or the extent, depending on Extent Protect). When inactive, write type commands may be accepted. In this case, the program has read-write access to the portion of the volume which is accessible (e.g., the entire volume or the extent, depending on Extent Protect).

Mark Protect
When active, any commands which cause tape marks or other formatting marks are rejected. When inactive, commands which cause tape marks or other formatting marks may be accepted.

Partition Protect
When active, any commands which cause the medium to change the currently active partition are rejected. When inactive, commands which cause the medium to change partitions may be accepted.

Stage Protect
When active, any commands which cause the medium to be loaded or unloaded are rejected. This includes, for example, a Rewind Unload command. When inactive, commands which cause the medium to be loaded or unloaded may be accepted.

All of the above controls can be used independently of each other and, except for Extent Protect, independently of the Define Extent command. The controls would typically be provided through a mode set type command and would be persistent once issued until changed by the program, or possibly, until the current volume is unloaded.

Thirdly, the Mode Set and Define Extent commands are treated as commands reserved for the control program to provide a mechanism that prevents the application from modifying the above controls or the extent definition. As a result, the control program 22 can inhibit the use of the Define Extent command and Mode Set commands to the application as required. Hence, the control program has the ability to do all of the following: 1) limit accesses to a specific extent of the medium; 2) limit the scope of volume access (more specifically, read-only or read-write access can be selected); 3) limit volume access to a single volume or partition by disabling the ability to change the medium or the partition; and 4) limit the volume formatting to data-only modifications.

Thus, the requirement to erase old data to prevent object reuse is eliminated by the present invention. Multiple partitions on a volume or multiple files within a partition can be supported without an exposure to unauthorized access. The control program establishes a set of constraints at the beginning of processing which prevent the application from performing any actions which result in unauthorized access, file formatting integrity errors, or volume integrity errors. These constraints do not require the control program to monitor the contents of channel programs and the overhead is limited to the establishment of constraints once per file activation (e.g., OPEN).

Thus, the present invention has been described herein with reference to a particular embodiment for a particular application. Those having ordinary skill in the art and access to the present teachings will recognize additional modifications applications and embodiments within the scope thereof. For example, the invention is not limited to use with tape devices. The teachings of the present invention may be used with any storage media. Further, the invention is not limited to the commands defined in the illustrative embodiment. The Invention allows for a variety of commands to be defined and used to suite a particular application.

It is therefore intended by the appended claims to cover any and all such applications, modifications and embodiments within the scope of the present invention.

Accordingly,

What is claimed is:

1. A system for limiting access to a tape device comprising:

first means for generating a set of control parameters for said device corresponding to an application program, said control parameters providing a set of access capabilities which are selectable in accordance with attributes of the application, said first means being a control program which processes application attributes and data set attributes to generate said control parameters, wherein a first of said control parameters defines an extent on a tape within said tape device and a second of said control parameters indicates the type of access permitted by said application program to said extent on said tape;

second means for receiving a command to access said device from said application program; and third means for using said parameters to process said command to control access to said device by said application program, said third means including means for using the control parameters to manage access to data stored on a sequential access volume.

2. The invention of claim 1 wherein the sequential access volume maintains multiple datasets, has residual data, has specific file formatting, and is removable from the device.

3. A system for limiting access to a tape device comprising:

a control program for processing application attributes, dataset attributes to generate a set of control parameters for said device corresponding to an application program, a first of said control parameters defining an extent on a tape within said tape device and a second of said control parameters indicating the type of access permitted by said application program to said extent on said tape;

second means for receiving a command to access said device from said application program; and a tape device control unit for using said parameters to process said command to control access to said device by said application program.

4. A method for limiting access to a tape device including the steps of:

generating a set of control parameters for said tape device corresponding to an application program based on application attributes and dataset attributes, said control parameters providing a set of access capabilities which are selectable in accordance with attributes of the application, wherein a first of said control parameters defines an extent on a tape within said tape device and a second of said control parameters indicates the type of access permitted by said application program to said extent on said tape;

receiving a command to access said tape device from said application program; and processing said parameters to control access to said tape device by said application program.

* * * * *